United States Patent [19]
Fisher

[11] 3,861,592

[45] Jan. 21, 1975

[54] TRACTION MAT

[76] Inventor: Sandor Jehuda Fisher, 589 Palmerston Ave., Toronto, Ontario, Canada

[22] Filed: June 29, 1973

[21] Appl. No.: 375,002

[52] U.S. Cl. .................. 238/14, 52/177, 152/210
[51] Int. Cl. ............................................ B60c 27/00
[58] Field of Search .............. 238/14; 152/208, 225; 404/19, 32; 52/177

[56] References Cited
UNITED STATES PATENTS

| | | | |
|---|---|---|---|
| 2,479,760 | 8/1949 | Merrick | 238/14 |
| 3,202,358 | 8/1965 | Griswold | 238/14 |
| 3,395,862 | 8/1968 | Lundberg | 238/14 |
| 3,672,422 | 6/1972 | Greipel | 238/14 |
| 3,675,701 | 7/1972 | Garrison | 152/225 |

*Primary Examiner*—M. Henson Wood, Jr.
*Assistant Examiner*—Richard A. Bertsch
*Attorney, Agent, or Firm*—George A. Rolston

[57] ABSTRACT

A traction mat formed of injection moulded thermoplastic material, having formed therein a plurality of integral sleeves defining socket-like recesses extending transversely through the thickness of the material, being closed at one end and open at the other, and provided with metallic pins or studs frictionally secured in such sockets, and projecting from such open end for the purpose of engaging a road bed.

8 Claims, 3 Drawing Figures

PATENTED JAN 21 1975 3,861,592

TRACTION MAT

The invention relates to a traction mat for use by automobiles, trucks and the like in obtaining traction in ice, snow, mud or other slippery conditions.

BACKGROUND OF THE INVENTION

Traction mats as such for use by automobiles and the like have been well known for many years. They are usually placed under the driving wheels of the vehicle, so that the vehicle may be driven out of a rut or pot hole by obtaining additional traction on the traction mat. In order to achieve this result, such traction mats have been provided with a variety of constructions and configurations and devices for enhancing their grip on the road bed. Such devices have included indentations in the surface of the mat, mats formed of various materials, including sheet metal with openings or indentations formed therein, and in some cases studs have been fastened completely through the mat. In addition, many of such mats have been provided with similar devices for increasing the traction between the mat and the road wheel of the vehicle.

While such traction mats have been more or less successful from the viewpoint of achieving the desired function, in a variety of ways, by present day standards they are prohibitively expensive to manufacture, and for that reason cannot be marketed effectively in the majority of cases.

It is therefore the general objective of the invention to provide such a traction mat having improved durability of construction, while being of more economical materials, and manufacturing methods, and at the same time incorporating improved design features providing for more effective function in use.

BRIEF SUMMARY OF THE INVENTION

The invention seeks to provide a traction mat formed of injection moulded thermoplastic material, having formed therein a plurality of integral sleeves defining socket-like recesses extending transversely through the thickness of the material, being closed at one end and open at the other, and provided with metallic pins or studs frictionally secured in such sockets, and projecting from such open end for the purpose of engaging a road bed.

Preferably, the mat according to the invention will incorporate tire engaging rib means at at least one end of the mat, which can be slipped under the edge of the tire so as to provide substantially instantaneous grip between the tire and the mat.

According to a further feature of the invention the plastic material is thickened in a substantially circular area around each of the sockets whereby to resist any tendency for the pins to twist under load.

According to a further feature of the invention the mat is provided with interlocking rib and groove means at each end whereby successive mats can be linked together to provide extended traction mats if desired.

The foregoing and other objectives will become apparent from the following description of the preferred embodiment of the invention which is given here by way of example only with reference to the following drawings.

DESCRIPTION OF A SPECIFIC EMBODIMENT

Figure 1:
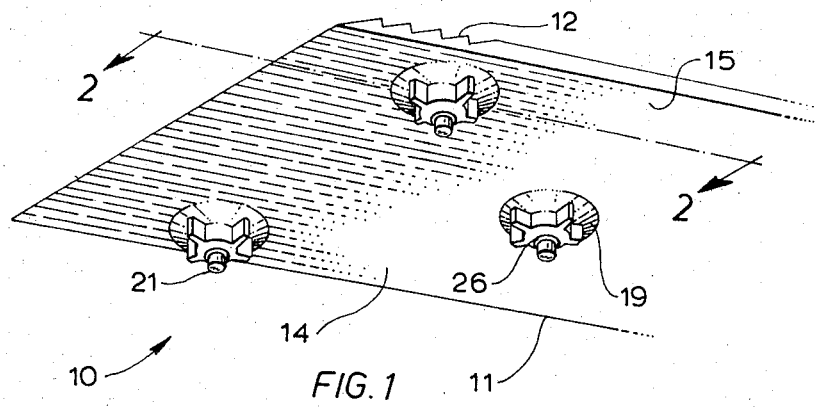
FIG. 1 is an lower perspective view of a traction mat according to the invention showing the lower surface thereof.

Referring now to the illustrations, it will be seen that the traction mat shown generally as 10 comprises a rectangular sheet of plastic material 11 having a leading end 12 and a trailing end 13, and an upper surface 14 and an under surface 15.

At spaced intervals across the plastic sheet 11 there are provided a series of integrally moulded plastic sleeves 16, being closed at their upper ends 17, and open at their lower ends 18.

Figure 2:
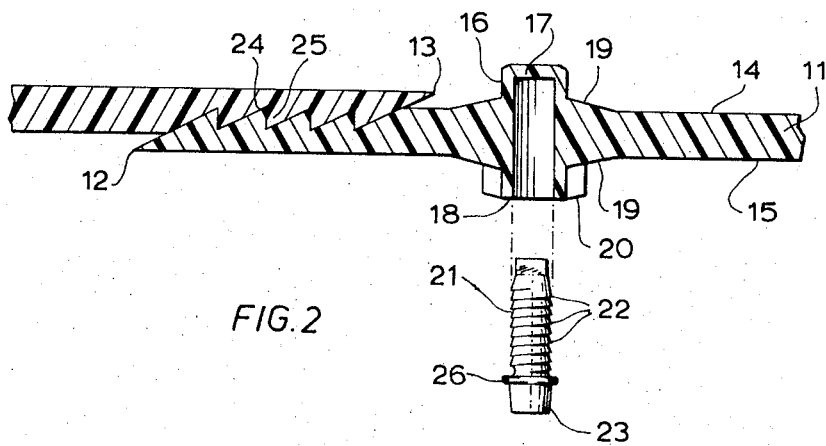
FIG. 2 is a section along the line 2—2 of FIG. 1, showing the pin withdrawn from its recess for the sake of clarity and, FIG. 3 is a lower plan view of a portion of the mat of FIG. 1 showing a single sleeve or socket and pin.

It will be noted that the sleeves 16 extend both above and below the surfaces 14 and 15 of the plastic sheet 11, and in order to maintain them in their alignment normal to the plane of the sheet 11, the plastic material surrounding the sleeves 16 is formed into generally circular thickened areas 19 extending in a tapering manner as shown in FIG. 2 both on the upper surface 14 and the lower surface 15 on the sheet 11.

Figure 3:
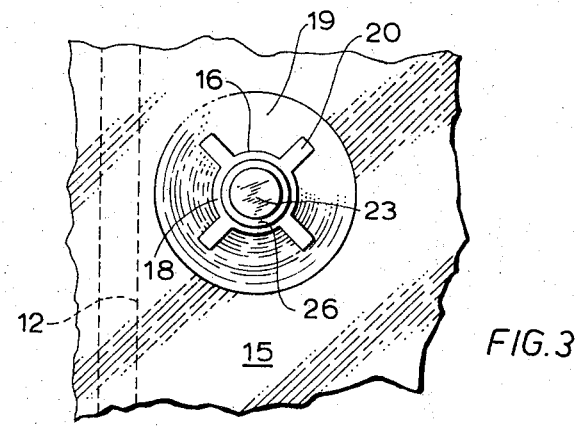

In order to provide still further rigidity the lengthwise strengthening ribs or butresses 20 are provided along the lower portion of the sleeves 16, at spaced intervals therearound as shown in FIGS. 2 and 3.

Metallic pins 21 of steel or the like, of generally cylindrical shape are provided to fit snugly within the sleeves 16, and are preferably provided with some form of frictional retaining means, such as for example the ribs or threads 22 which will retain the pins 21 within the sleeves 16. Preferably, the lower end 23 of the pins 21 will extend outwardly from the open end 18 of the sleeves 16. The pins 21 incorporate collars 26 which engage the outside of the sleeves 16 as shown to prevent the pins being forced through the mat.

At the leading end of the sheet 11 there is provided a plurality of transverse serrations or ridges 24, preferably having their crests directed more or less away from the leading edge 12 as shown in FIG. 2, whereby the same can be slipped beneath the tire of an automobile to provide instantaneous traction therewith.

If it is desired to permit the traction mats 10 to be linked one behind the other to provide extended traction, the trailing edges 13 may be provided with additional such serrations 25 on the under surface 15, whereby such serrations 25 may be lain over the serrations 24 on the upper surface 15 of the next adjacent mat whereby to provide a continuous mat if desired.

In operation, the traction mat 10 is placed immediately in front of the driving wheels, preferably with the serrations 24 placed as close as possible to the actual surface of the tire. The pointed ends of the studs will be directed downwardly towards the road bed and the closed ends of the sockets will be directed upwardly. The automobile or truck will then be driven forwardly over the traction mat, and obtain traction.

Clearly, if traction over a greater distance is required more traction mats can be laid end to end as shown in FIG. 2.

The foregoing is a description of a preferred embodiment which is given here by way of example only. The invention is not to be taken as limited to any of the features as described but comprehends all such variations as come within the scope of the appended claims.

What I claim is:

1. A traction mat for vehicles, for obtaining increased traction on a road bed, said traction mat comprising;
   a flexible sheet member of generally rectangular shape having two ends and of predetermined thickness;
   sleeve means formed integrally with said sheet member at spaced intervals therealong having a length greater than the thickness of said sheet member, and extending from said sheet member along axes angled relative to the plane of said sheet member, said sleeve means being closed at one end and open at the other whereby to define blind ended socket-like openings extending from the open end of said sleeve means into said sheet member, and,
   metallic stud means secured within said sleeve means, having inner ends seating on said closed ends of said sleeves and outer ends extending from the open ends thereof.

2. The traction mat as claimed in claim 1 wherein said sleeve means extend from both the upper and lower sides of said sheet member, the upper said end being closed and the lower said end being open whereby to define a continuous socket for a said stud extending through said sheet member from the lower side thereof and closed at its upper end.

3. The traction mat as claimed in claim 1 wherein said sheet member around each said sleeve means is formed integrally with an increased thickness.

4. The traction mat as claimed in claim 1 including rib members formed along at least one end of said traction mat across the upper surface thereof, for engagement by said vehicle.

5. The traction mat as claimed in claim 1 including serrations formed along the upper surface of said sheet member at one end thereof and corresponding serrations formed across the lower surface of said sheet member at the other end thereof whereby successive said mats can be interlocked.

6. The traction mat as claimed in claim 1 including reinforcing rib means formed around said sleeve means.

7. The traction mat as claimed in claim 1 wherein the stud means within the sleeve members are threaded, and including collars on the stud means engaging the lower ends of the sleeve means.

8. The traction mat as claimed in claim 1 including frictional formations on said stud means for frictional engagement with the interior of said sleeve means.

* * * * *